US008645605B2

(12) United States Patent
Subramaniyan et al.

(10) Patent No.: US 8,645,605 B2
(45) Date of Patent: Feb. 4, 2014

(54) SHARING MULTIPLE VIRTUAL FUNCTIONS TO A HOST USING A PSEUDO PHYSICAL FUNCTION

(75) Inventors: Nagarajan Subramaniyan, San Jose, CA (US); Jack Regula, Chapel Hill, NC (US); Jeffrey Michael Dodson, Portland, OR (US)

(73) Assignee: PLX Technology, Inc., Sunnyvale, CA (US)

( * ) Notice: Subject to any disclaimer, the term of this patent is extended or adjusted under 35 U.S.C. 154(b) by 272 days.

(21) Appl. No.: 13/212,700

(22) Filed: Aug. 18, 2011

(65) Prior Publication Data

US 2012/0167085 A1 Jun. 28, 2012

Related U.S. Application Data

(63) Continuation-in-part of application No. 12/979,904, filed on Dec. 28, 2010, now Pat. No. 8,521,941.

(51) Int. Cl.
G06F 13/20 (2006.01)
(52) U.S. Cl.
USPC ............ 710/313; 710/305; 710/104; 719/321

(58) Field of Classification Search
USPC .......... 710/313, 104, 305–306; 719/321, 324, 719/327
See application file for complete search history.

(56) References Cited

U.S. PATENT DOCUMENTS 7,934,033 B2 * 4/2011 Malwankar et al. .......... 710/104

* cited by examiner

Primary Examiner — Ryan Stiglic
Assistant Examiner — Kim Huynh
(74) Attorney, Agent, or Firm — Beyer Law Group LLP

(57) ABSTRACT

A method is provided comprising: enumerating a group of available virtual functions corresponding to the physical function; mapping the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function; receiving a request to access the physical function from the single host; and providing the pseudo physical function to the single host for loading on the single host, in response to the receiving of the request, wherein the pseudo physical function is designed to call management functions of the single host to enable the group of available virtual functions in a local hierarchy of the single host.

15 Claims, 8 Drawing Sheets

SHARING MULTIPLE VIRTUAL FUNCTIONS TO A HOST USING A PSEUDO PHYSICAL FUNCTION

CROSS-RELATION TO RELATED APPLICATION

This application is a continuation-in-part of and claims priority to co-pending U.S. patent application Ser. No. 12/979,904, entitled "MULTI-ROOT SHARING OF SINGLE-ROOT INPUT/OUTPUT VIRTUALIZATION," filed on Dec. 28, 2010, which is hereby incorporated by reference herein in its entirety and for all purposes.

BACKGROUND OF THE INVENTION

1. Field of the Invention

The present invention relates generally to electronic communication. More specifically, the present invention relates to the sharing of multiple virtual functions to a host using a pseudo physical function.

2. Description of the Related Art

Virtualization involves a way to run multiple environments on a single device or system. Using virtualization, extra processing power and/or storage on a device can be more efficiently used by sharing it between more than one environment. Each environment is known as a virtual machine (VM), and typically these systems are constructed in a manner that allows programs running within a virtual machine to operate without knowledge that the environment is sharing resources with other environments.

In addition to interoperability, virtual machines also must take into account security concerns. Typically, I/O virtualization solutions provide the same isolation that was found when the environment was operating on a separate physical machine. Isolation involves separation of memory space, input/output (I/O) streams, interrupts, and the ability to isolate control operations, I/O operations, and errors.

Computer architectures have advanced greatly over the years. Lately it is becoming more and more commonplace for chip designers to include external data interfaces, such as Universal Serial Bus (USB) interfaces into their motherboards. These interfaces are known as host controllers. The processor is typically then connected to the other components of the computer system via an input/output (I/O) interconnect system.

There are many different computer I/O interconnect standards available. One of the most popular over the years has been the peripheral component interconnect (PCI) standard. PCI allows the bus to act like a bridge, which isolates a local processor bus from the peripherals, allowing a Central Processing Unit (CPU) of the computer to run must faster.

Recently, a successor to PCI has been popularized, termed PCI Express (or, simply, PCIe). PCIe provides higher performance, increased flexibility and scalability for next-generation systems, while maintaining software compatibility with existing PCI applications. Compared to legacy PCI, the PCI Express protocol is considerably more complex, with three layers—the transaction, data link and physical layers.

In a PCI Express system, a root complex device connects the processor and memory subsystem to the PCI Express switch fabric comprised of one or more switch devices (embodiments are also possible without switches, however). In PCI Express, a point-to-point architecture is used. Similar to a host bridge in a PCI system, the root complex generates transaction requests on behalf of the processor, which is interconnected through a local I/O interconnect. Root complex functionality may be implemented as a discrete device, or may be integrated with the processor. A root complex may contain more than one PCI Express port and multiple switch devices can be connected to ports on the root complex or cascaded.

In order to standardize a way to share PCIe devices in a way that virtualization goals are still met, the Single-Root Input/Output Virtualization (SR-IOV) standard was introduced. SR-IOV provides a mechanism by which a single root function (such as a single Ethernet port) can appear to be multiple separate physical devices. In this manner, a port leading to a PCIe device can be shared between multiple virtual machines, thus effectively sharing the PCIe devices between the virtual machines without either virtual machine needing to be aware of the existence of the other.

An SR-IOV-capable device (such as a PCIe endpoint) can be configured to appear in the PCI configuration space as multiple functions, each with its own configuration space complete with Base Address Registers (BARs). A virtual machine manager (VMM) assigns one or more virtual functions to a virtual machine by mapping the actual configuration space of the virtual functions to the configuration space presented to the virtual machine by the VMM.

As an example, FIG. 1 depicts a standard PCIe device, having three different functions 100, 102, 104, each with its own physical resources 106, 108, 110, respectively, as well as internal routing 112, configuration resources 114, and a PCIe port 116. PCIe functionality shared by all functions is managed through function 100. It should be noted that while this figure illustrates only three functions, a PCIe device can typically support up to 256 functions.

SR-IOV introduces the concepts of physical functions and virtual functions. A physical function is a PCIe function that supports the SR-IOV capability. A virtual function is a lightweight function that is associated with a physical function but that can be assigned to a particular virtual machine. In other words, each physical function may be assigned multiple virtual functions, and then each of these multiple virtual functions can be assigned to a different virtual machine, effectively sharing the physical function without any of the other virtual machines being aware of this. All of this capability is managed through the Virtual Machine Manager (VMM) in coordination with the SR-PCIM component in the hypervisor that manages the SR-IOV virtual functions. This is depicted in FIG. 2. Here, a PCIe SR-IOV capable device is shown having two physical functions 200, 202, and each physical function is shown having three virtual functions 204, 206, and 208, and then 210, 212, and 214, respectively. It should be known that two physical functions and three virtual functions per physical functions are just examples depicted in this diagram. In reality, there can be any number of physical functions (up to device limits), and each physical function can have a different number of associated virtual functions.

While SR-IOV allows multiple virtual machines within a single host to share physical resources, there is no capability to allow virtual machines across multiple hosts to share physical resources. That is why it is known as "Single-Root" IOV, because it only allows a single root complex, and thus a single host, to share resources of an attached PCIe device.

With PCIe devices expanding every year, it is now more standard to have devices, such as switches, connecting multiple hosts to multiple PCIe devices. It would be advantageous to allow these multiple hosts to share PCIe endpoint functions, because it would allow for the PCIe endpoint functions to be dynamically provisioned among the hosts to meet workload requirements. One proposed solution is known as Multi-Root Input/Output Virtualization (MR-IOV). This method has been standardized, however due to resource limitations it has not proved popular, and is barely in use. Even if one were to try and implement it on a new switch, the lack of availability of MR-IOV compatible PCIe endpoints would make such a switch virtually useless.

In parent application Ser. No. 12/979,904, entitled "MULTI-ROOT SHARING OF SINGLE-ROOT INPUT/OUTPUT VIRTUALIZATION", a solution was described that used resource redirection methods when multiple hosts are connected using the non-transparent ports of a PCI express switch that supports shared I/O mechanisms. As described in that application, this allows the multi-root sharing of endpoint functions using the existing SR-IOV standard that is in use by a large number of devices, thus having the advantages of MR-IOV without needing to actually implement MR-IOV.

A hardware/systems solution that implements this sharing of SR-IOV to multiple hosts has a limitation on the hardware resources, such that only a few virtual devices can be exposed per connected host. This issue mainly comes from the mapping tables and bookkeeping needed to redirect the virtual functions to the correct physical end points.

What is needed is a solution that extends the number of potentially shared virtual functions without reducing the number of independently addressable devices in the PCIe bus without expanding the physical function expose on the PCIe bus to match the number of virtual functions seen by the host software and operating system.

SUMMARY OF THE INVENTION

In a first embodiment of the present invention, a method for sharing virtual functions corresponding to a physical function of a single root input/output virtualization (SR-IOV) endpoint with a single host is provided, the method performed by a management system of a switch, the method comprising: enumerating a group of available virtual functions corresponding to the physical function; mapping the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function; receiving a request to access the physical function from the single host; and providing the pseudo physical function to the single host for loading on the single host, in response to the receiving of the request, wherein the pseudo physical function is designed to call management functions of the single host to enable the group of available virtual functions in a local hierarchy of the single host.

In a second embodiment of the present invention, a method for sharing virtual functions corresponding to a physical function of a single root input/output virtualization (SR-IOV) endpoint with a single host is provided, the method performed by the single host, the method comprising: upon enumeration, obtaining a pseudo physical function from a management system of a switch, wherein the pseudo physical function contains a mapping of a group of available virtual functions relating to the physical function, wherein the mapping exposes a subset of the SR-IOV capability from a configuration space for the physical function and was created by using a copy of the configuration space for the physical function while assigning unique vendor and device identifications for different classes of devices; using the pseudo physical function to call management functions of the single host to enable the group of available virtual functions in a local hierarchy of the single host; and upon invocation of one of the group of available virtual functions, applying CSR redirection via the pseudo physical function.

In a third embodiment of the present invention, a system is provided comprising: an SR-IOV endpoint having a first physical function with a first configuration space; a host; a switch coupled to the SR-IOV endpoint, the switch comprising: SR-IOV capable management software; a physical function driver corresponding to the physical function on the SR-IOV endpoint; and a second configuration space being a copy of the first configuration space with different vendor and device identifications that are unique for different classes of devices.

In a fourth embodiment of the present invention, a switch capable of sharing virtual functions corresponding to a physical function of an SR-IOV endpoint with a single host is provided, comprising: an upstream port connected to a management system compatible with SR-IOV; a processor configured to: enumerate a group of available virtual functions corresponding to the physical function; map the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function; receive a request to access the physical function from the single host; and provide the pseudo physical function to the single host for loading on the single host, in response to the receiving of the request, wherein the pseudo physical function is designed to call management functions of the single host to enable the group of available virtual functions in a local hierarchy of the single host.

In a fifth embodiment of the present invention, an apparatus for sharing virtual functions corresponding to a physical function of a single root input/output virtualization (SR-IOV) endpoint with a single host, the apparatus comprising: means for enumerating a group of available virtual functions corresponding to the physical function; means for mapping the group of available virtual functions to a non-transparent port of the switch by creating a copy of a configuration space for the physical function while assigning unique vendor and device identifications for different classes of devices, wherein the mapping creates a pseudo physical function; means for receiving a request to access the physical function from the single host; and means for providing the pseudo physical function to the single host for loading on the single host, in response to the receiving of the request, wherein the pseudo physical function is designed to call management functions of the single host to enable the group of available virtual functions in a local hierarchy of the single host.

In a sixth embodiment of the present invention, an apparatus for sharing virtual functions corresponding to a physical function of a single root input/output virtualization (SR-IOV) endpoint with a single host, the apparatus comprising: means for, upon enumeration, obtaining a pseudo physical function from a management system of a switch, wherein the pseudo physical function contains a mapping of a group of available virtual functions relating to the physical function, wherein the mapping exposes a subset of the SR-IOV capability from a configuration space for the physical function and was created by using a copy of the configuration space for the physical function while assigning unique vendor and device identifications for different classes of devices; means for using the pseudo physical function to call management functions of the single host to enable the group of available virtual functions in a local hierarchy of the single host; and means for upon invocation of one of the group of available virtual functions, applying CSR redirection via the pseudo physical function.

In a seventh embodiment of the present invention, a program storage device readable by a machine tangibly embodying a program of instructions executable by the machine to perform a method for sharing virtual functions corresponding to a physical function of a single root input/output virtualization (SR-IOV) endpoint with a single host, the method performed by a management system of a switch, the method comprising: enumerating a group of available virtual functions corresponding to the physical function; mapping the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function; receiving a request to access the physical function from the single host; and providing the pseudo physical function to the single host for loading on the single host, in response to the receiving of the request, wherein the pseudo physical function is designed to call management functions of the single host to enable the group of available virtual functions in a local hierarchy of the single host.

DETAILED DESCRIPTION OF SPECIFIC EMBODIMENTS

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

Figure 1:
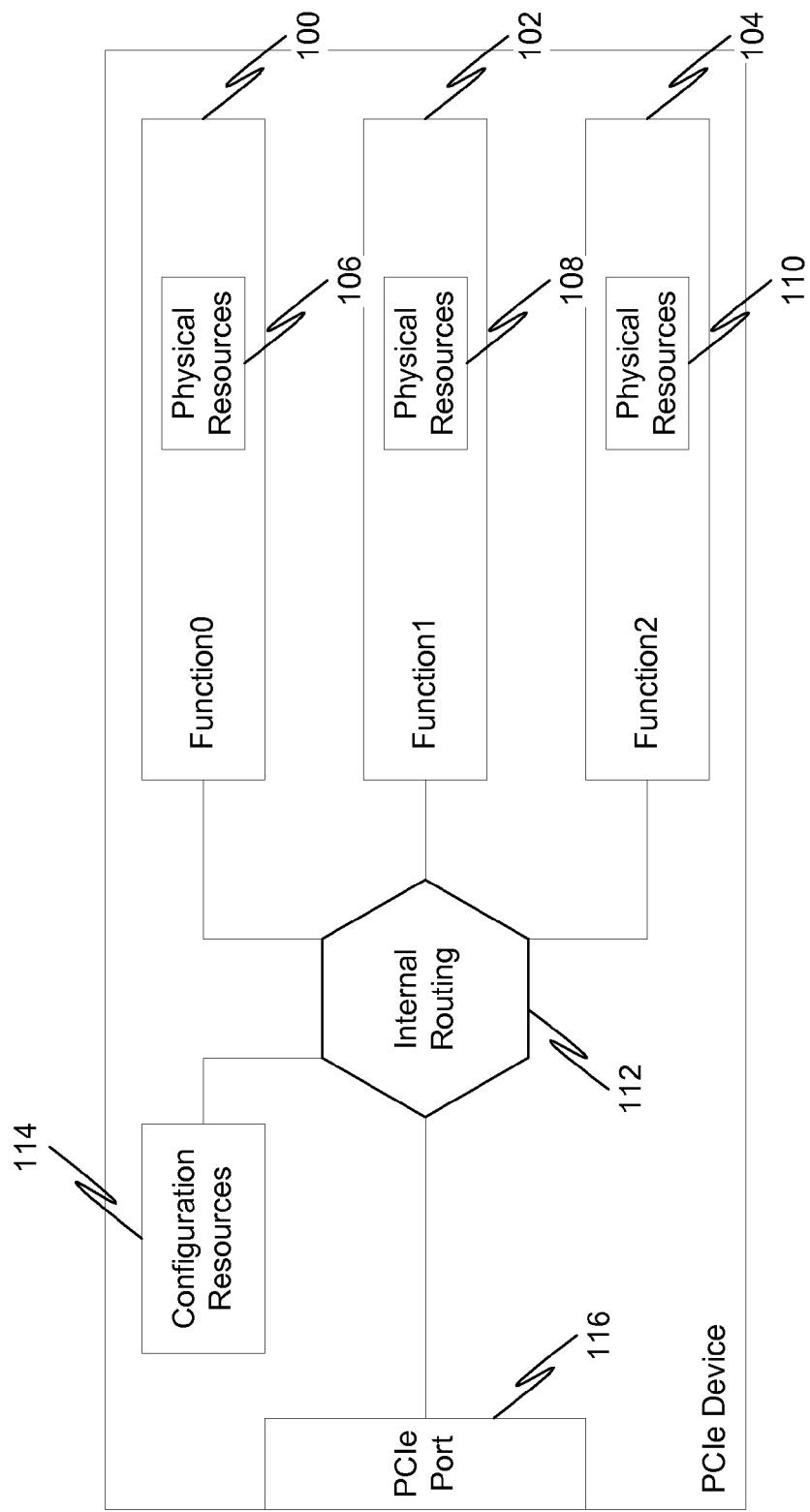
FIG. 1 depicts a standard PCIe device, having three different functions, each with its own physical resources.
Figure 2:
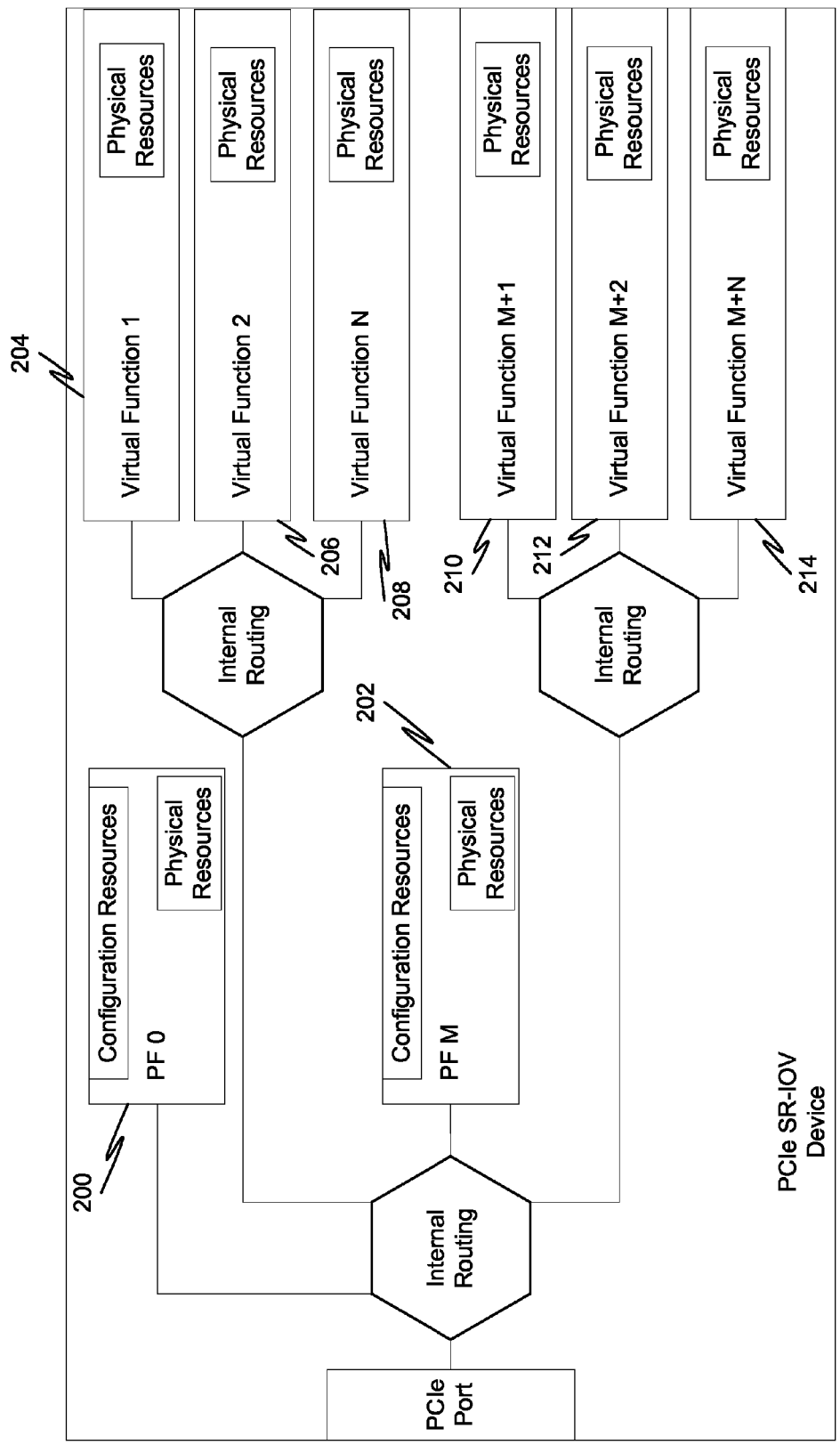
FIG. 2 depicts an SR-IOV endpoint having a physical function and multiple virtual functions.
Figure 3:
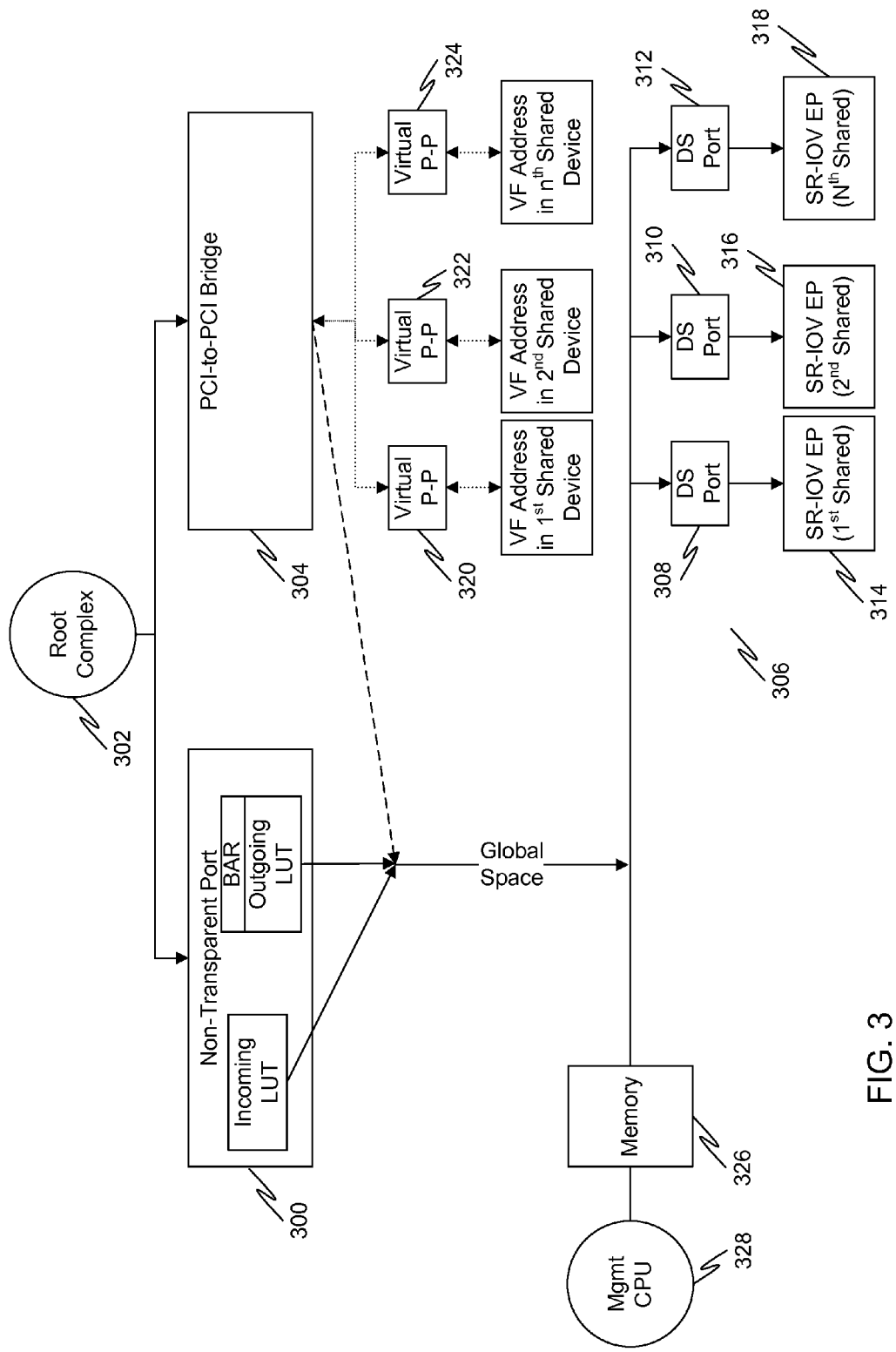
FIG. 3 is a diagram illustrating both the physical and virtual hierarchies for a single host's shares of several SR-IOV endpoints.

FIG. 3 is a diagram illustrating both the physical and virtual hierarchies for a single host's shares of several SR-IOV. The physical structures include the non-transparent port 300 (which connects to host 302), the transparent PCI-PCI bridge of the upstream port 304, and the global space/management hierarchy 306 where the SR-IOV endpoints connect. For each downstream port 308, 310, 312 in the management hierarchy 506 that connects to a share endpoint 314, 316, 318, there is a corresponding emulated virtual PCI-PCI bridge 320, 322, 324, respectively. The emulated virtual PCI-PCI bridges' only registers are located in a memory 326 of the management processor 328 and which are accessed by redirecting CSR requests to the management processor 328.

In an embodiment of the present invention, when a group of virtual functions of an SR-IOV device is shared to a single host, the combined resources for all those virtual functions are mapped to a non-transparent port connected to the host. The host operating system (and BIOS) see this as a single physical device in the PCIe hierarchy via a pseudo physical function. The operating system loads a pseudo physical function driver that handles this function based on the vendor ID and device ID of the function. The pseudo physical function driver calls on the Single Root PCI Configuration Manager (SR-PCIM) of the local operating system to enable SR-IOV virtual functions so that the group of virtual functions assigned to this host are exposed as virtual functions of this Pseudo physical function. The exposed virtual functions exhibit the underlying device virtual function's PCI configuration space, and hence the vendor drivers for these functions, if available, will be loaded by the host operating system.

The pseudo physical function driver effectively combines the hardware resources required for I/O sharing a block of virtual functions into resources required for sharing one I/O device function.

The pseudo physical function driver can be connected to a management server that runs the real physical function driver for the shared SR-IOV device, and gets its settings for that system from the management software running on that system. Any control and status register (CSR) access to the pseudo physical function device on the host will also be managed by the management driver/software running in the management system, by using a configuration space register redirection (CSR redirection) applied on the pseudo physical function device on the host.

The CSR redirection on the pseudo physical function is performed for two purposes. The first is to connect with the management system to provide the pseudo physical function configuration space accesses by the host system. The second is that, while most virtual functions configuration accesses are handled by the host's SR-PCIM in conjunction with the pseudo physical function driver, there are some accesses to the virtual functions configuration space that need to be forwarded on the management system and that is performed through the pseudo physical function driver.

Figure 4:
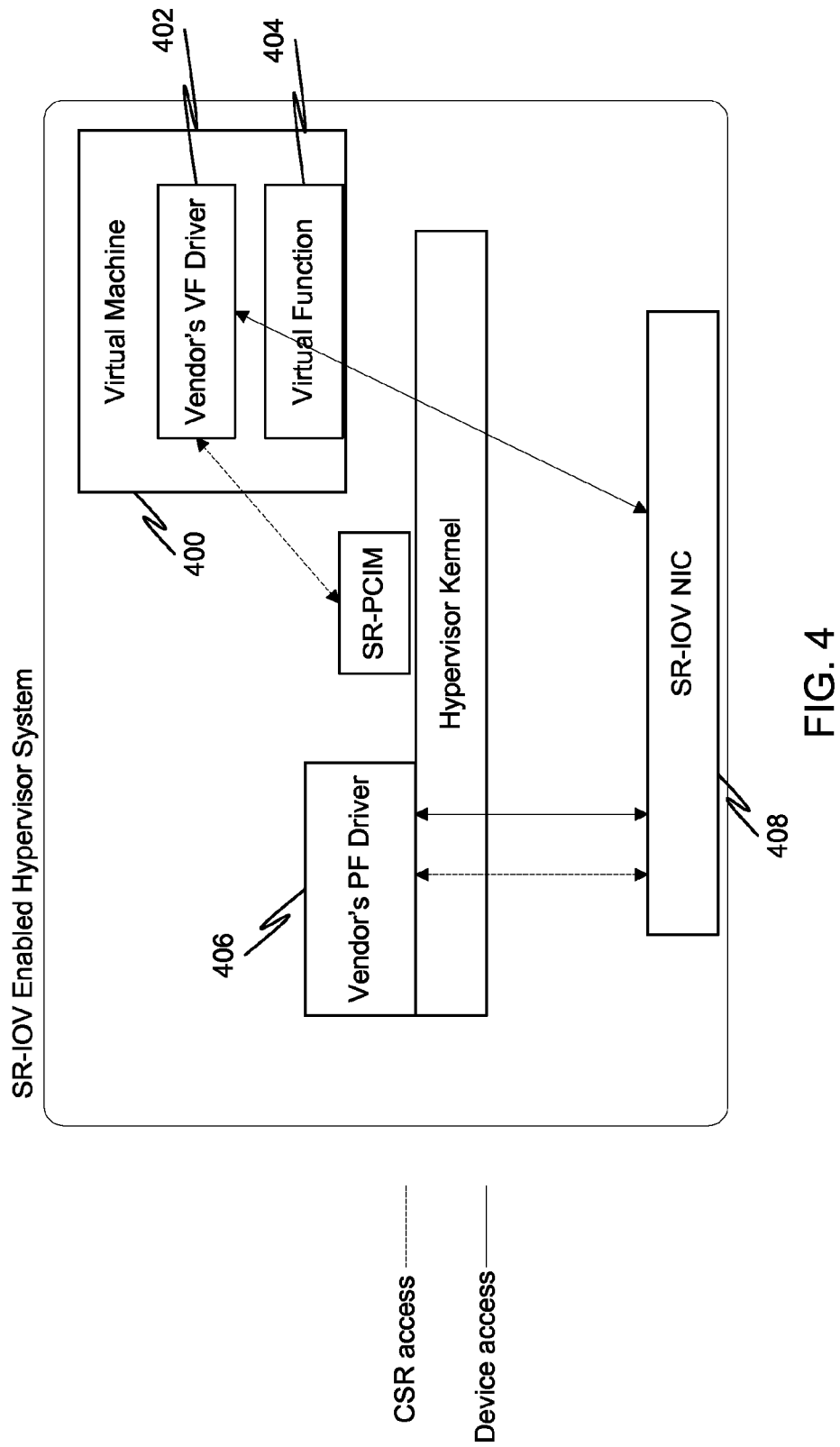
FIG. 4 is a diagram illustrating an SR-IOV adapter directly plugged into a single host and shared with multiple virtual machines in that host in accordance with an embodiment of the present invention.

FIG. 4 is a diagram illustrating an SR-IOV adapter directly plugged into a single host and shared with multiple virtual machines in that host in accordance with an embodiment of the present invention. Here, an SR-IOV enabled hypervisor system includes a virtual machine 400 having a virtual function driver 402 from a vendor, which enables a virtual function 404. A physical function driver 406 also provided by the vendor enables the physical function though an SR-IOV network interface controller (NIC) 408.

Figure 5:
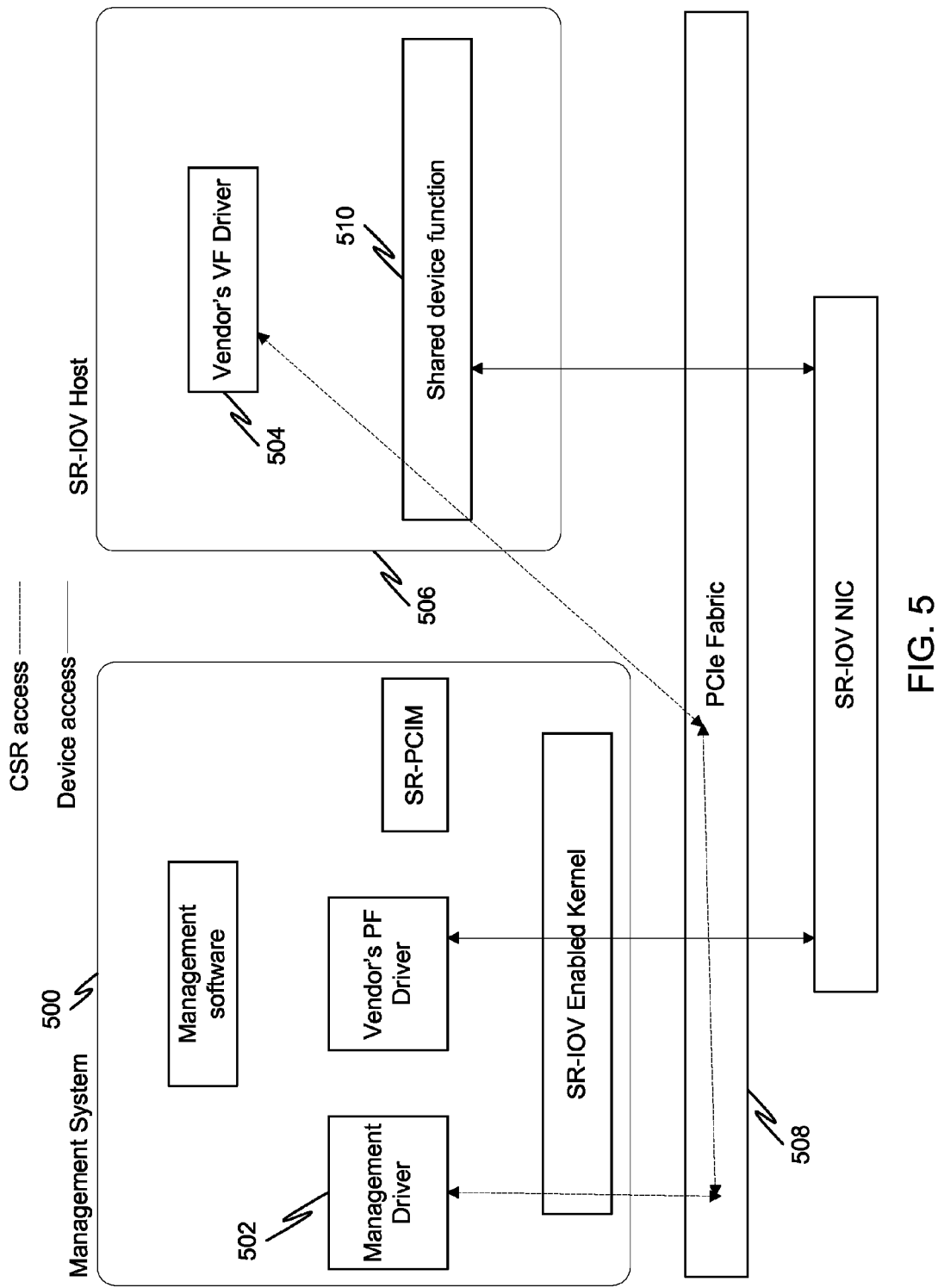
FIG. 5 is a diagram illustrating a host connected to a PCI switch and one virtual function of an SR-IOV adapter in the switch shared to that host, in accordance with an embodiment of the present invention.

FIG. 5 is a diagram illustrating a host connected to a PCI switch and one virtual function of an SR-IOV adapter in the switch shared to that host, in accordance with an embodiment of the present invention. Here, a management system 500 provides for a management driver 502, which communicates with a virtual function driver 504 on an SR-IOV aware or unaware host or system 506, through a PCI fabric 508, allowing a device function 510 on the host or system 506 to be shared.

Figure 6:
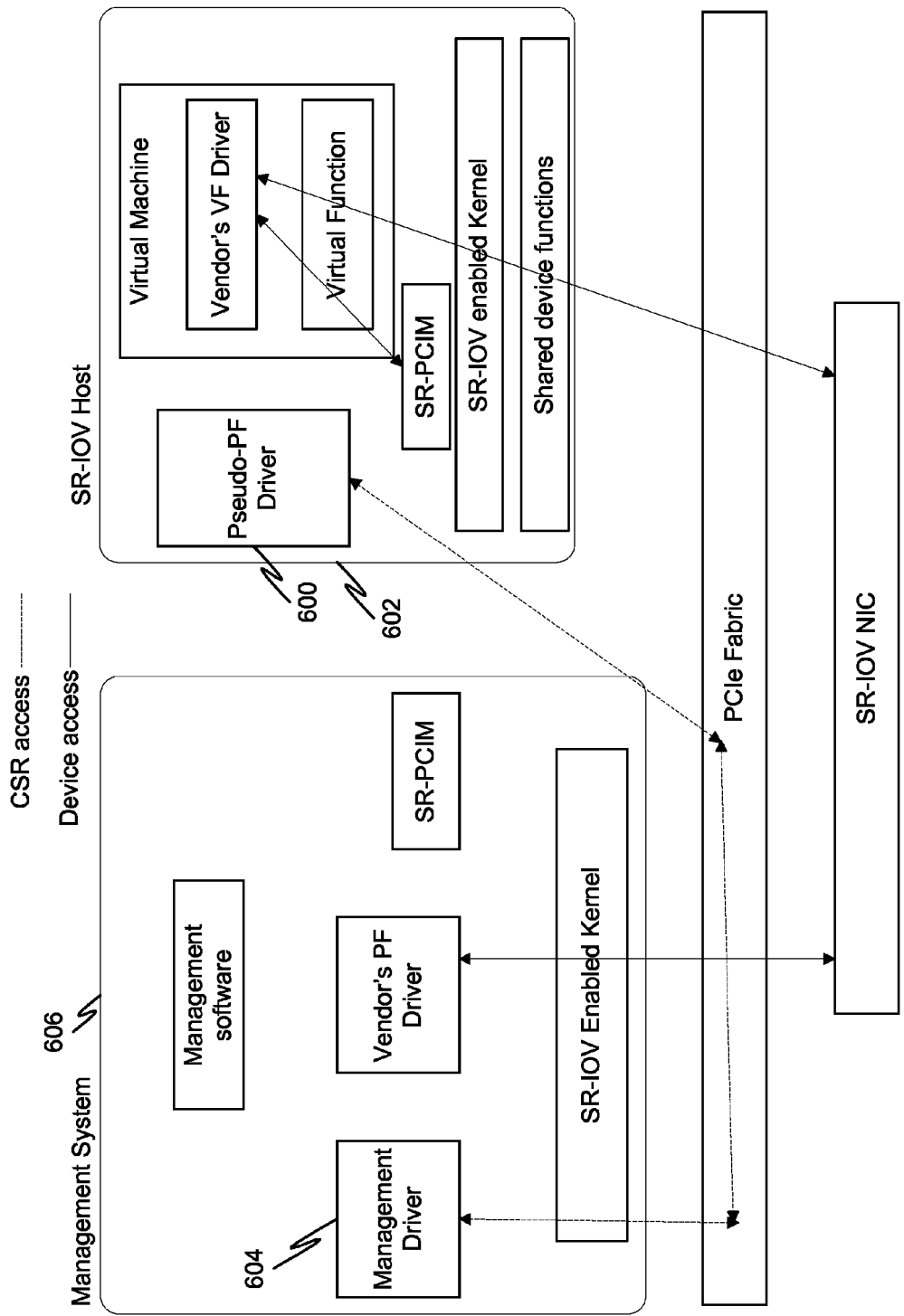
FIG. 6 is a diagram illustrating multiple virtual functions shared with a single server using a pseudo physical function mechanism of the present invention.

FIG. 6 is a diagram illustrating multiple virtual functions shared with a single server using a pseudo physical function mechanism of the present invention. Here, a pseudo physical function driver 600 is installed on an SR-IOV capable host or system 602. The pseudo physical function driver 600 communicates with a management driver 604 in management system 606 by way of config space redirection to obtain its information. The pseudo physical function driver 600 then uses this information to expose the virtual functions on the server. It should be noted that the CSR redirections set up for each virtual function in FIG. 5 are not needed here, as the virtual function of the block is handled by the local SR-PCIM and the pseudo-PF driver.

As an example, a PCIe switch with an upstream port is connected to a management system that is capable of SR-IOV and runs management software. A server is connected to this switch using a PCIe extender or by means of additional transparent PCIe switches. An SR-IOV adapter can then be provided from a third party, connected as a device in the PCIe switch.

The management driver and the operating system in the management system identifies and enumerates the SR-IOV I/O adapter's physical function. The management system first loads the vendor supplied physical function driver. The physical function driver, by system calls to the SR-PCIM present in the operating system, enables and creates the virtual functions in the management system's view of PCI express tree hierarchy. The management driver then gets a pool of these virtual functions that may be assigned to any connected server in the switch.

An administrator, either manually or via stored configurations/policies, sets up the sharing rules for the virtual functions. The administrator can assign individual, single virtual functions to a specific host port in the switch. The administrator can assign a group of contiguous virtual functions to a specific port.

The management driver software then sets up the sharing based on various settings. For single virtual functions to a specific server, the management driver software sets up the host port for a single virtual device, with CSR from that host port connected to the virtual function on the management system. When the host enumerates or makes configuration space accesses, the host port send that request to the management system as a message or through an interrupt. The management driver then handles this call, looking up the host port source ID, connecting it to the virtual function locally, and returning the correct values from the local system's view of that virtual function. As the device BAR registers for this virtual function are already set up translation entries on the host port, any accesses from the host port to the memory mapped BARs of this virtual function go directly to the device and do not come through the management system. As the host system discovers this new device (as a copy of the virtual function in the management system), it loads the required driver software for this device based on the virtual functions vendor ID and device ID from its configuration space. This driver can be a vendor supplied driver.

For a group of virtual functions to a single server, the management software sets up the virtual function with CSR redirection that maps to a software created copy of a configuration space for a physical function in the management system. This physical function configuration space is copied from the SR-IOV adapter's physical function configuration space, with some exceptions. For example the vendor ID and device ID are assigned identifications that will be unique for different classes of devices (e.g., networking, storage, generic device, etc.). The class and sub-class codes can come from the original device's physical function configuration space. The SR-IOV capability can only show the required subset of the original physical function configuration space, based on the group of virtual functions that are shared to this host port; the BAR ranges will be the correct subset that is needed to map the required group of virtual functions. Effectively, the management software sets up just one virtual device on the host port, but this single virtual device will serve as the pseudo physical function representing the group of virtual functions.

The host system, when it enumerates, gets this physical function (the pseudo physical function) through the CSR set up as described above. The host system then loads the pseudo physical function driver for this function based on the vendor ID and the device ID. The pseudo physical function driver then calls the host system's SR-PCIM to enable the group of virtual functions in the local system's PCIe hierarchy. When the host system's SR-PCIM adds these virtual functions based on the pseudo physical function's SR-IOV capability, the host operating system starts loading the vendor-supplied drivers for this group of virtual functions (as these virtual functions will show the third-party vendor ID and device ID—the same values as they show in the management system). The device resets and secondary bus resets will only act on the virtual functions in the real device underneath, and not on the entire SR-IOV I/O adapter.

The management system need not load the virtual function drivers, as that could conflict with the virtual function driver running in the host system. Any communication between the virtual function on the host and the physical function on the management system can be performed through hardware, so as to not require any further software involvement.

Figure 7:
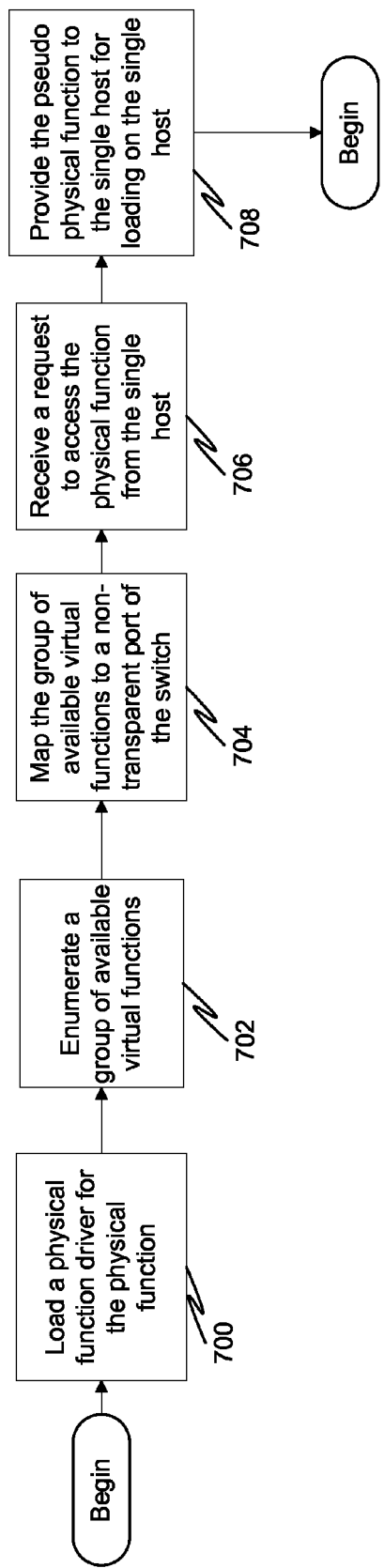
FIG. 7 is a flow diagram illustrating a method for sharing virtual functions corresponding to a physical function of an SR-IOV endpoint with a single host in accordance with an embodiment of the present invention.

FIG. 7 is a flow diagram illustrating a method for sharing virtual functions corresponding to a physical function of an SR-IOV endpoint with a single host in accordance with an embodiment of the present invention. This method is described from the point of view of the management system (e.g., PCIM) of a PCIe switch. The method begins when the system sees a single SR-IOV physical function and doesn't see virtual functions. At 700, a physical function driver for the physical function can be loaded. The physical function driver may be supplied by a vendor of the SR-IOV endpoint. At 702, a group of available virtual functions corresponding to the physical function are enumerated. At 704, the group of available virtual functions is mapped to a non-transparent port of the switch by creating a copy of a configuration space for the physical function while assigning unique vendor and device identifications for different classes of device, thus creating a pseudo physical function. This may include running the physical function driver to make system calls to the management system to create virtual functions in a tree hierarchy view of the management system. This may also include setting up a plurality of the group of available virtual functions with CSR redirection. At 706, a request to access the physical function is received from the single host. This request may be a configuration space access sent from the single host as a message or through an interrupt. At 708, the pseudo physical function is provided to the single host for loading on the single host, in response to the receiving of the request, wherein the pseudo physical function is designed to call management functions of the single host to enable the group of available virtual functions in a local hierarchy of the single host. This providing may include looking up host port source identification, connecting the host port source identification to a virtual function from the group of available virtual functions, and returning values from the virtual function.

Figure 8:
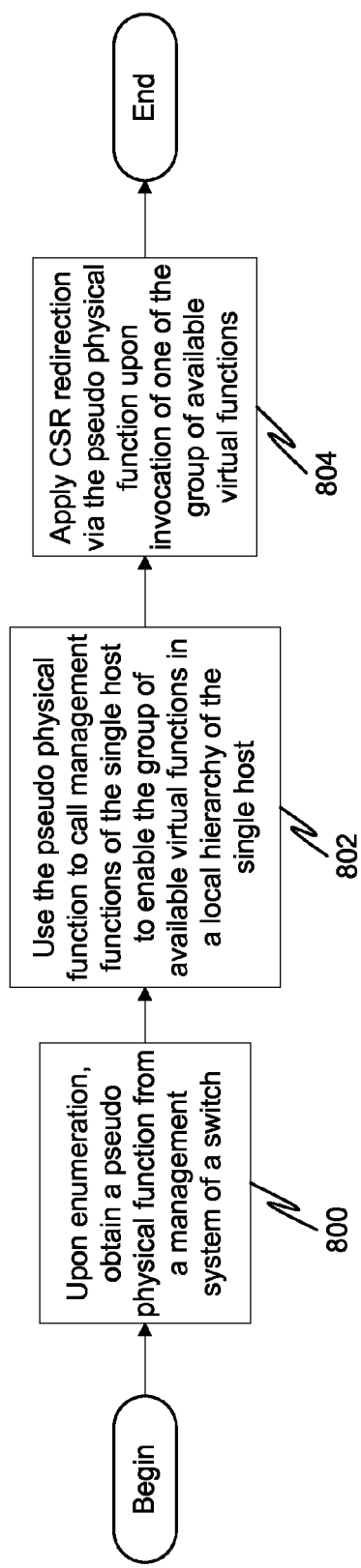
FIG. 8 is a flow diagram illustrating a method for sharing virtual functions corresponding to a physical function of an SR-IOV endpoint with a single host in accordance with another embodiment of the present invention.

FIG. 8 is a flow diagram illustrating a method for sharing virtual functions corresponding to a physical function of an SR-IOV endpoint with a single host in accordance with another embodiment of the present invention. This method is described from the point of view of the single host. At 800, upon enumeration, a pseudo physical function is obtained from a management system of a switch, wherein the pseudo physical function contains a mapping of a group of available virtual functions relating to the physical function, wherein the mapping was created by using a copy of a configuration space for the physical function while assigning unique vendor and device identifications for different classes of devices. At 802, the pseudo physical function is used to call management functions of the single host to enable the group of available virtual functions in a local hierarchy of the single host. At 804, upon invocation of one of the group of available virtual functions, CSR redirection is applied via the pseudo physical function. Any access of memory mapped registers of one of the group of available virtual functions may be sent to the switch to be forwarded directly to the SR-IOV endpoint, bypassing the management system of the switch.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for sharing virtual functions corresponding to a physical function of a single root input/output virtualization (SR-IOV) endpoint with a single host, the method performed by a management system of a switch, the method comprising:
   discovering, via a physical function driver, virtual functions corresponding to the physical function and creating a view in the management system;
   running the physical function driver to make system calls to the management system to create virtual functions in a tree hierarchy view of the management system;
   enumerating a group of available virtual functions corresponding to the physical function;
   mapping the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function;
   receiving a request to access the physical function from the single host; and
   providing the pseudo physical function to the single host for loading on the single host, in response to the receiving of the request, wherein the pseudo physical function is designed to call management functions of the single host to enable the group of available virtual functions in a local hierarchy of the single host.

2. The method of claim 1, further comprising loading the physical function driver for the physical function.

3. The method of claim 2, wherein the physical function driver is supplied by a vendor of the SR-IOV endpoint and the physical function driver calls on the single root PCI configuration manager (SR-PCIM) of the management system to enable SR-IOV virtual functions.

4. The method of claim 1, wherein the request to access the physical function is a configuration space access sent from the single host as a message or through an interrupt.

5. The method of claim 1, wherein the providing includes:
   looking up a host port source identification;
   connecting the host port source identification to a virtual function from the group of available virtual functions; and
   returning values from the virtual function.

6. The method of claim 1, wherein the mapping comprises:
   setting up a plurality of the group of available virtual functions with CSR redirection.

7. A method for sharing virtual functions corresponding to a physical function of a single root input/output virtualization (SR-IOV) endpoint with a single host, the method performed by the single host, the method comprising:
   upon enumeration by a management system of a switch of a group of available virtual functions corresponding to the physical function, obtaining a pseudo physical function from the management system of the switch, wherein the pseudo physical function contains a mapping of a group of available virtual functions relating to the physical function, wherein the mapping exposes a subset of the SR-IOV capability from a configuration space for the physical function and was created by using a copy of the configuration space for the physical function while assigning unique vendor and device identifications for different classes of devices;

using the pseudo physical function to call management functions of the single host to enable the group of available virtual functions in a local hierarchy of the single host; and upon invocation of one of the group of available virtual functions, applying CSR redirection via the pseudo physical function.

8. The method of claim 7, wherein the management system is SR-IOV capable and has SR-PCIM components.

9. The method of claim 7, further comprising:

sending any accesses of memory mapped registers of one of the group of available virtual functions to the switch to be forwarded directly to the SR-IOV endpoint, bypassing the management system of the switch.

10. A switch capable of sharing virtual functions corresponding to a physical function of an SR-IOV endpoint with a single host, comprising:

an upstream port connected to a management system compatible with SR-IOV and has SR-PCIM components;

a processor configured to:
  discover virtual functions corresponding to the physical function and create virtual functions in a tree hierarchy view;
  enumerate a group of available virtual functions corresponding to the physical function;
  map the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function;
  receive a request to access the physical function from the single host; and
  provide the pseudo physical function to the single host for loading on the single host, in response to the receiving of the request, wherein the pseudo physical function is designed to call management functions of the single host to enable the group of available virtual functions in a local hierarchy of the single host.

11. The switch of claim 10, wherein the switch is a PCIe switch.

12. An apparatus for sharing virtual functions corresponding to a physical function of a single root input/output virtualization (SR-IOV) endpoint with a single host, the apparatus comprising:

means for discovering virtual functions corresponding to the physical function and creating a view in a management system;

means for enumerating a group of available virtual functions corresponding to the physical function;

means for mapping the group of available virtual functions to a non-transparent port of the switch by creating a copy of a configuration space for the physical function while assigning unique vendor and device identifications for different classes of devices, wherein the mapping creates a pseudo physical function;

means for receiving a request to access the physical function from the single host; and means for providing the pseudo physical function to the single host for loading on the single host, in response to the receiving of the request, wherein the pseudo physical function is designed to call management functions of the single host to enable the group of available virtual functions in a local hierarchy of the single host.

13. An apparatus for sharing virtual functions corresponding to a physical function of a single root input/output virtualization (SR-IOV) endpoint with a single host, the apparatus comprising:

means for, upon enumeration by a management system of a switch of a group of available virtual functions corresponding to the physical function, obtaining a pseudo physical function from the management system of the switch, wherein the pseudo physical function contains a mapping of a group of available virtual functions relating to the physical function, wherein the mapping exposes a subset of the SR-IOV capability from a configuration space for the physical function and was created by using a copy of the configuration space for the physical function while assigning unique vendor and device identifications for different classes of devices;

means for using the pseudo physical function to call management functions of the single host to enable the group of available virtual functions in a local hierarchy of the single host; and means for upon invocation of one of the group of available virtual functions, applying CSR redirection via the pseudo physical function.

14. A non-transitory program storage device readable by a machine tangibly embodying a program of instructions executable by the machine to perform a method for sharing virtual functions corresponding to a physical function of a single root input/output virtualization (SR-IOV) endpoint with a single host, the method performed by a management system of a switch, the method comprising:

discovering virtual functions corresponding to the physical function and creating a view in a management system;

enumerating a group of available virtual functions corresponding to the physical function;

mapping the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function;

receiving a request to access the physical function from the single host; and providing the pseudo physical function to the single host for loading on the single host, in response to the receiving of the request, wherein the pseudo physical function is designed to call management functions of the single host to enable the group of available virtual functions in a local hierarchy of the single host.

15. A method for sharing virtual functions corresponding to a physical function of a single root input/output virtualization (SR-IOV) endpoint with a single host, the method performed by a management system of a switch, the method comprising:

at the management system:
  discovering, via a physical function driver, virtual functions corresponding to the physical function and creating a view in the management system;
  enumerating a group of available virtual functions corresponding to the physical function;
  mapping the group of available virtual functions to a non-transparent port of the switch by creating a copy of a configuration space for the physical function while assigning unique vendor and device identifications for different classes of devices, wherein the mapping creates a pseudo physical function exposing a subset of the SR-IOV capability from the configuration space for the physical function;

receiving a request to access the physical function from the single host; and providing the pseudo physical function to the single host for loading on the single host, in response to the receiving of the request, wherein the pseudo physical function is designed to call management functions of the single host to enable the group of available virtual functions in a local hierarchy of the single host;

at the host:

upon enumeration by the management system of a switch of a group of available virtual functions corresponding to the physical function, obtaining a pseudo physical function from the management system of the switch, wherein the pseudo physical function contains a mapping of a group of available virtual functions relating to the physical function, wherein the mapping exposes a subset of the SR-IOV capability from a configuration space for the physical function and was created by using a copy of the configuration space for the physical function while assigning unique vendor and device identifications for different classes of devices;

using the pseudo physical function to call management functions of the single host to enable the group of available virtual functions in a local hierarchy of the single host; and upon invocation of one of the group of available virtual functions, applying CSR redirection via the pseudo physical function.

* * * * *